United States Patent
Jonsson

(10) Patent No.: US 7,389,697 B2
(45) Date of Patent: Jun. 24, 2008

(54) PRESSURE SENSOR FOR DETECTING SMALL PRESSURE DIFFERENCES AND LOW PRESSURES

(75) Inventor: Steffan Jonsson, Karlskoga (SE)

(73) Assignee: MKS Instruments, Andover, MA (US)

( * ) Notice: Subject to any disclaimer, the term of this patent is extended or adjusted under 35 U.S.C. 154(b) by 370 days.

(21) Appl. No.: 11/134,001

(22) Filed: May 20, 2005

(65) Prior Publication Data

US 2006/0000289 A1 Jan. 5, 2006

Related U.S. Application Data

(63) Continuation of application No. 10/642,106, filed on Aug. 15, 2003, now abandoned, which is a continuation of application No. 09/582,057, filed as application No. PCT/SE98/02441 on Dec. 22, 1998, now abandoned.

(30) Foreign Application Priority Data

Dec. 22, 1997 (SE) .................................. 9704840

(51) Int. Cl.
*G01L 9/12* (2006.01)
(52) U.S. Cl. ........................................ 73/724
(58) Field of Classification Search ............ 73/718–724
See application file for complete search history.

(56) References Cited

U.S. PATENT DOCUMENTS

| | | | |
|---|---|---|---|
| 2,416,557 A | 2/1947 | Wiener | |
| 2,751,530 A | 6/1956 | Armstrong | |
| 2,753,515 A | 7/1956 | Rickner | |

(Continued)

FOREIGN PATENT DOCUMENTS

DE 1 282 302 11/1968

(Continued)

OTHER PUBLICATIONS

Bal Sal Engineering Company, Inc., Santa Ana, California, BAL SAL Canted Coil Spring Gaskets, pp. 3.2-2 and 3.2-14.

(Continued)

*Primary Examiner*—Max Noori
(74) *Attorney, Agent, or Firm*—Wilmer Cutler Pickering Hale and Dorr LLP

(57) ABSTRACT

A capacitive pressure sensor of substantially ceramic material comprises a thick base plate (100), a front plate (140) having the same thickness as the base plate and a movable diaphragm (120) located between the front plate and the base plate. Capacitor electrodes (121*b*, 121*a*) are provided at the surface of the diaphragm facing the base plate and form a measurement capacitor. The diaphragm (120) is extremely thin and is produced by sintering a ceramic material such aluminum oxide. Owing to a pressing process used during the sintering a strong, very thin diaphragm is obtained having no mechanical stresses and fracture indications. It can be produced to have a very small thickness in order to provide pressure sensors having a high sensitivity, which can also for high-vacuum applications tolerate to be subjected to the atmospheric pressure. A shielding plate (110) can be inserted between the base plate (100) compensating the measurement capacitor. The shielding plate (110) can also be extremely thin, having a thickness down to a thickness corresponding to the thickness of a diaphragm (120).

20 Claims, 4 Drawing Sheets

U.S. PATENT DOCUMENTS

| | | |
|---|---|---|
| 2,755,419 A | 7/1956 | Hollmann |
| 2,800,796 A | 7/1957 | Westcott et al. |
| 2,907,320 A | 10/1959 | Weese et al. |
| 2,999,386 A | 9/1961 | Wolfe |
| 3,000,215 A | 9/1961 | Atanasoff et al. |
| 3,113,459 A | 12/1963 | Slater |
| 3,153,847 A | 10/1964 | Lindberg |
| 3,243,998 A | 4/1966 | Vosteen |
| 3,318,153 A | 5/1967 | Lode |
| 3,354,721 A | 11/1967 | Fiske |
| 3,371,537 A | 3/1968 | Kiene |
| 3,460,310 A | 8/1969 | Adcock et al. |
| 3,619,742 A | 11/1971 | Rud, Jr. |
| 3,620,083 A | 11/1971 | Dimeff et al. |
| 3,675,072 A | 7/1972 | Hahn et al. |
| 3,858,097 A | 12/1974 | Polye |
| 4,381,492 A | 7/1975 | Kuisma |
| 3,952,234 A | 4/1976 | Birchall |
| 3,968,695 A | 7/1976 | Weiss et al. |
| 4,008,619 A | 2/1977 | Alcaide et al. |
| 4,011,901 A | 3/1977 | Flemings et al. |
| 4,020,674 A | 5/1977 | Fechter et al. |
| 4,084,438 A | 4/1978 | Lee et al. |
| 4,084,439 A | 4/1978 | Teter et al. |
| 4,120,206 A | 10/1978 | Rud, Jr. |
| 4,136,603 A | 1/1979 | Doyle, Jr. |
| 4,141,252 A | 2/1979 | Lodge |
| 4,168,517 A | 9/1979 | Lee |
| 4,168,518 A | 9/1979 | Lee |
| 4,176,557 A | 12/1979 | Johnston |
| 4,178,621 A | 12/1979 | Simonelic et al. |
| 4,229,776 A | 10/1980 | Antikainen et al. |
| 4,302,063 A | 11/1981 | Rudy |
| 4,322,775 A | 3/1982 | Delatorre |
| 4,334,725 A | 6/1982 | Teshima et al. |
| 4,357,834 A | 11/1982 | Kimura |
| 4,358,814 A | 11/1982 | Lee et al. |
| 4,389,895 A | 6/1983 | Rud, Jr. |
| 4,422,125 A | 12/1983 | Antonazzi et al. |
| 4,422,335 A | 12/1983 | Ohnesorge et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Crampton et al. |
| 4,542,436 A | 9/1985 | Carusillo |
| 4,562,742 A | 1/1986 | Bell |
| 4,567,773 A | 2/1986 | Cooper et al. |
| 4,572,204 A | 2/1986 | Kimura |
| 4,587,851 A | 5/1986 | Mortberg |
| 4,598,381 A | 7/1986 | Cucci |
| 4,603,371 A | 7/1986 | Frick |
| 4,628,403 A | 12/1986 | Kuisma |
| 4,670,733 A | 6/1987 | Bell |
| 4,679,643 A | 7/1987 | Bove |
| 4,691,574 A | 9/1987 | Delatorre |
| 4,714,464 A | 12/1987 | Newton |
| 4,730,496 A | 3/1988 | Knecht |
| 4,733,875 A | 3/1988 | Azuma et al. |
| 4,735,090 A | 4/1988 | Jeffrey et al. |
| 4,735,098 A | 4/1988 | Kavli et al. |
| 4,738,276 A | 4/1988 | Adams |
| 4,748,861 A | 6/1988 | Matsumoto et al. |
| 4,765,188 A | 8/1988 | Krechmery et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,850,227 A | 7/1989 | Luettgen et al. |
| 4,851,015 A | 7/1989 | Wagner et al. |
| 4,864,463 A * | 9/1989 | Shkedi et al. ............ 361/283.4 |
| 4,875,368 A | 10/1989 | Delatorre |
| 4,898,035 A | 2/1990 | Yajima et al. |
| 4,920,805 A | 5/1990 | Yajima et al. |
| 4,935,841 A | 6/1990 | Jonsson et al. |
| 4,943,032 A | 7/1990 | Zdeblick |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,048,165 A | 9/1991 | Cadwell |
| 5,050,034 A | 9/1991 | Hegner et al. |
| 5,134,887 A | 8/1992 | Bell |
| 5,150,275 A | 9/1992 | Lee et al. |
| 5,155,653 A | 10/1992 | Kremidas |
| 5,165,281 A | 11/1992 | Bell |
| 5,186,055 A | 2/1993 | Kovacich et al. |
| 5,188,780 A | 2/1993 | Lange et al. |
| 5,189,591 A | 2/1993 | Bernot |
| 5,249,469 A | 10/1993 | Johsson et al. |
| 5,257,542 A | 11/1993 | Voss |
| 5,271,277 A | 12/1993 | Pandorf |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,343,755 A | 9/1994 | Huss |
| 5,348,568 A | 9/1994 | Oda et al. |
| 5,349,492 A | 9/1994 | Kimura et al. |
| 5,349,865 A | 9/1994 | Kavli et al. |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A | 8/1995 | Lee |
| 5,443,410 A | 8/1995 | Ko |
| 5,485,345 A | 1/1996 | Lukasiewicz et al. |
| 5,497,620 A | 3/1996 | Stobbe |
| 5,499,158 A | 3/1996 | Bishop et al. |
| 5,499,533 A | 3/1996 | Miller et al. |
| 5,507,080 A | 4/1996 | Hayashi et al. |
| 5,525,280 A | 6/1996 | Shukla |
| 5,531,128 A | 7/1996 | Ryhanen |
| 5,539,611 A | 7/1996 | Hegner et al. |
| 5,541,561 A | 7/1996 | Grunert et al. |
| 5,542,300 A | 8/1996 | Lee |
| 5,544,399 A | 8/1996 | Bishop et al. |
| 5,544,490 A | 8/1996 | Manimi et al. |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,719,740 A | 2/1998 | Hayashi et al. |
| 5,756,899 A | 5/1998 | Ugai et al. |
| 5,800,235 A | 9/1998 | Ragsdale |
| 5,808,206 A | 9/1998 | Pandorf et al. |
| 5,811,685 A | 9/1998 | Grudzien, Jr. |
| 5,836,063 A * | 11/1998 | Hegner et al. .............. 29/25.42 |
| 5,885,682 A | 3/1999 | Tanimoto et al. |
| 5,911,162 A | 6/1999 | Denner |
| 5,916,479 A | 6/1999 | Schiabel et al. |
| 5,920,015 A | 7/1999 | Hallberg et al. |
| 5,925,824 A | 7/1999 | Soma et al. |
| 5,932,332 A | 8/1999 | Pandorf et al. |

| | | |
|---|---|---|
| 5,939,639 A | 8/1999 | Lethbridge |
| 5,942,692 A | 8/1999 | Haase et al. |
| 5,948,169 A | 9/1999 | Wu |
| 5,965,821 A | 10/1999 | Grudzien |
| 6,012,335 A | 1/2000 | Bashir et al. |
| 6,019,002 A | 2/2000 | Lee |
| 6,029,524 A | 2/2000 | Klauder et al. |
| 6,029,525 A | 2/2000 | Grudzien |
| 6,105,436 A | 8/2000 | Lischer et al. |
| 6,105,437 A | 8/2000 | Klug et al. |
| 6,112,597 A | 9/2000 | Tschope |
| 6,119,524 A | 9/2000 | Kobold |
| 6,148,674 A | 11/2000 | Park et al. |
| 6,205,861 B1 | 3/2001 | Lee |
| 6,209,398 B1 | 4/2001 | Fowler et al. |
| 6,315,734 B1 | 11/2001 | Nunome |
| 6,340,929 B1 | 1/2002 | Katou et al. |
| 6,423,949 B1 | 7/2002 | Chen et al. |
| 6,439,056 B1 * | 8/2002 | Jonsson ............... 73/708 |
| 6,122,976 A1 | 9/2002 | Jonsson |
| 6,443,015 B1 | 9/2002 | Poulin et al. |
| 6,451,159 B1 | 9/2002 | Lombardi et al. |
| 6,516,671 B2 | 2/2003 | Romo et al. |
| 6,528,008 B1 | 3/2003 | Bjoerkman |
| 6,568,274 B1 | 5/2003 | Lucas et al. |
| 6,578,427 B1 * | 6/2003 | Hegner ............... 73/724 |
| 6,588,280 B1 | 7/2003 | Quigley et al. |
| 6,591,687 B1 | 7/2003 | Bjoerkman et al. |
| 6,612,176 B2 | 9/2003 | Poulin et al. |
| 6,735,845 B2 | 4/2004 | Jonsson |
| 6,772,640 B1 | 8/2004 | Poulin et al. |
| 6,845,664 B1 | 1/2005 | Okojie |
| 6,901,808 B1 | 6/2005 | Sharpless et al. |
| 2002/0026835 A1 | 3/2002 | Jacob et al. |
| 2003/0003618 A1 | 1/2003 | Fujii et al. |
| 2003/0110865 A1 | 6/2003 | Johsson |
| 2003/0118802 A1 | 6/2003 | Bjoerkman |
| 2003/0167852 A1 | 9/2003 | Traverso |
| 2005/0262946 A1 | 12/2005 | Jonsson |

FOREIGN PATENT DOCUMENTS

| | | |
|---|---|---|
| DE | 40 11 901 A1 | 10/1991 |
| DE | 41 11 118 A1 | 10/1992 |
| DE | 4 136 995 A1 | 5/1993 |
| DE | 42 07 951-A-1 | 9/1993 |
| EP | 275 844 | 7/1988 |
| EP | 0 473 109 A2 | 3/1992 |
| EP | 0 490 807 A2 | 6/1992 |
| EP | 549 229 A2 | 6/1993 |
| FR | 895938 | 2/1945 |
| GB | 1 497 212 A | 1/1978 |
| GB | 2 044 523 | 10/1980 |
| GB | 2 162 837 | 2/1986 |
| GB | 2 188 155 | 9/1987 |
| JP | 56-162026 A2 | 12/1981 |
| JP | 01204022 A | 8/1989 |
| JP | 5-172675 A2 | 7/1993 |
| SU | 1362971 | 7/1986 |
| WO | WO-99/01731 | 1/1990 |
| WO | WO-95/06236 | 3/1995 |
| WO | WO-95/28623 | 10/1995 |
| WO | WO-95/28624 A1 | 10/1995 |
| WO | WO-98/28624 | 7/1998 |
| WO | WO-98/37392 | 8/1998 |
| WO | WO-98/37393 | 8/1998 |
| WO | WO-98/59228 | 12/1998 |
| WO | WO-99/32866 | 7/1999 |
| WO | WO-99/40405 | 8/1999 |
| WO | WO-00/43745 | 7/2000 |
| WO | WO-01/18516 A1 | 3/2001 |
| WO | WO-01/25740 | 4/2001 |
| WO | WO-02/31458 A2 | 4/2002 |
| WO | WO-02/054034 A1 | 7/2002 |
| WO | WO-03/056289 A1 | 7/2003 |
| WO | WO-03/078952 A2 | 9/2003 |
| WO | WO-03/089891 A1 | 10/2003 |

OTHER PUBLICATIONS

Baratron® Absolute Pressure Transmitters 400 Series, © 1996 MKS Instruments, Inc., Andover, MA.
Baratron® General Purpose Absolute Pressure Transducers, 1993 MKS Instruments, Inc.
Beynon, J.D.E., et al., "A Simple Micromanometer," 1964, J. Sci. Instruments, vol. 41(2), pp. 111-112.
Cook, D.B. et al., "A Simple Diaphragm Micromanometers," 1953, J. Scientific Instruments, vol. 30, pp. 238-239.
Derwent Abstract No. 88-197466/28, week 8828, Abstract of SU 1362971, Dec. 30, 1987.
English Translation from Russian of SU 1362971, Semenov et al., Method for the Evacuation of Absolute-Pressure Sensors and Device for the Carrying Out of the Method, Dec. 1987.
Instrument Specialities, Product Design & Shielding Selection Guide, Fabricated UltraFlex Gaskets, p. 108.
Patent Abstracts of Japan, Abstract of JP-59-56970, Apr. 2, 1984.
Tecknit, EMI Shield Products, "Custom strips," p. A-3.
Derwent abstract No. 91-199893/27, week 9127, Abstract of SU 1605146 (Pukhov, V.N.) Nov. 7, 1990.
Derwent abstract No. 91-199892/27, week 9127, Abstract of SU 1605145 (Mikhailov, P.G.), Nov. 7, 1990 (Accession No. 8695871).
Suzuki, Y., "Flexible Microgripper and its Application to Micromeasurement of Mechanical and Thermal Properties," Micro Electro Mechanical Systems, 1996, Feb. 11-15, 1996, pp. 406-411.

* cited by examiner

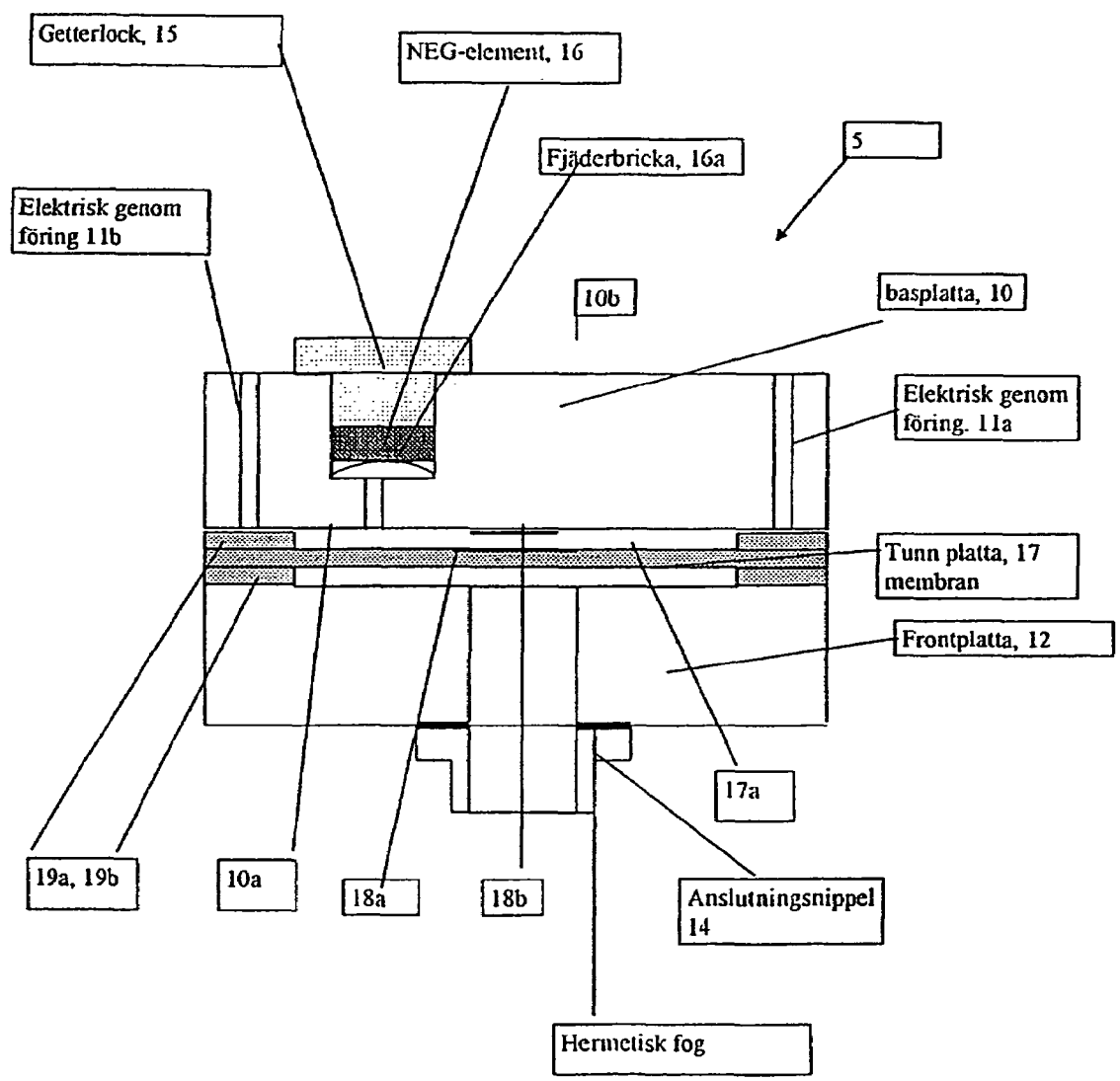

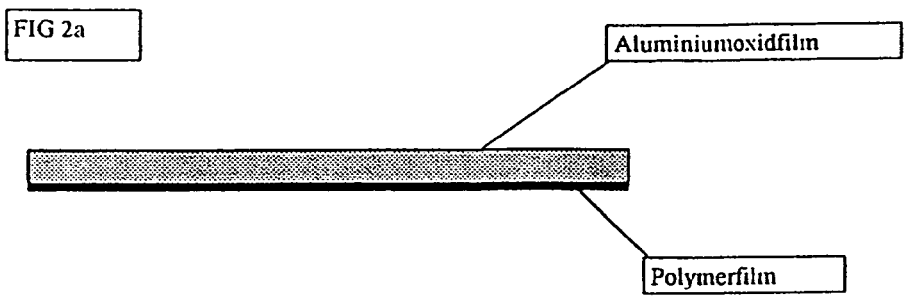
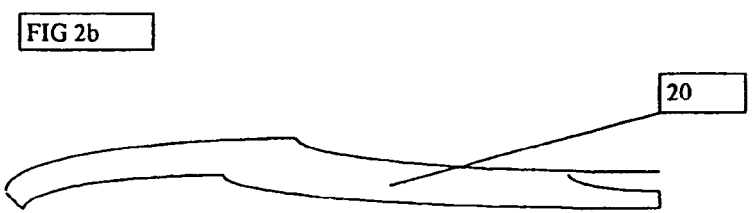
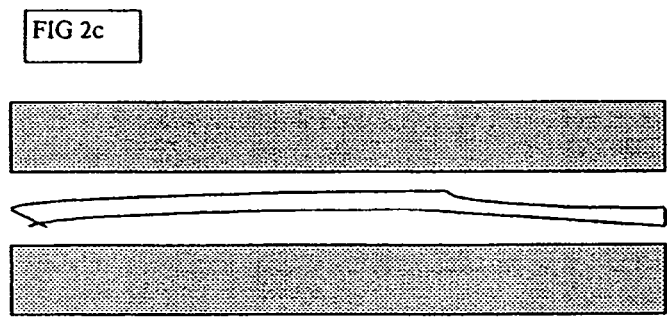
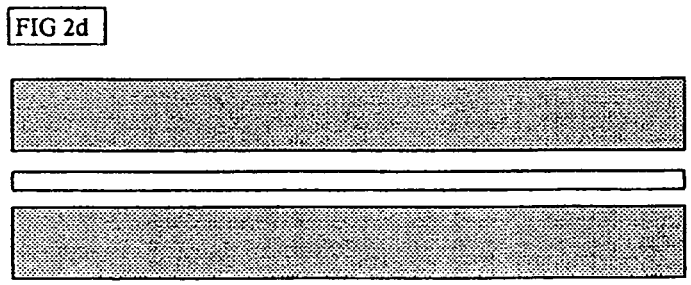
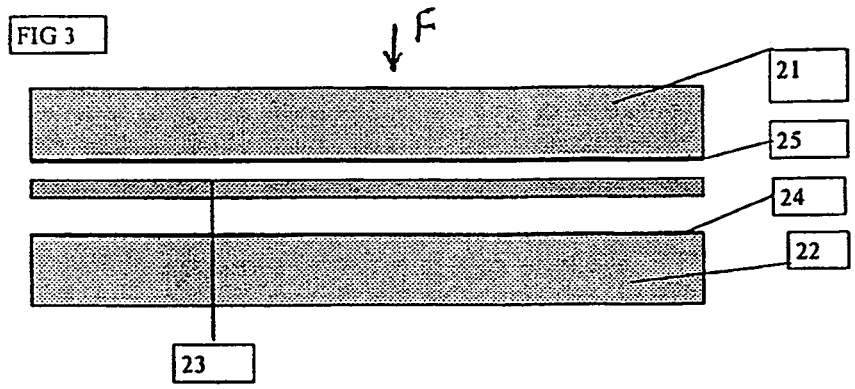

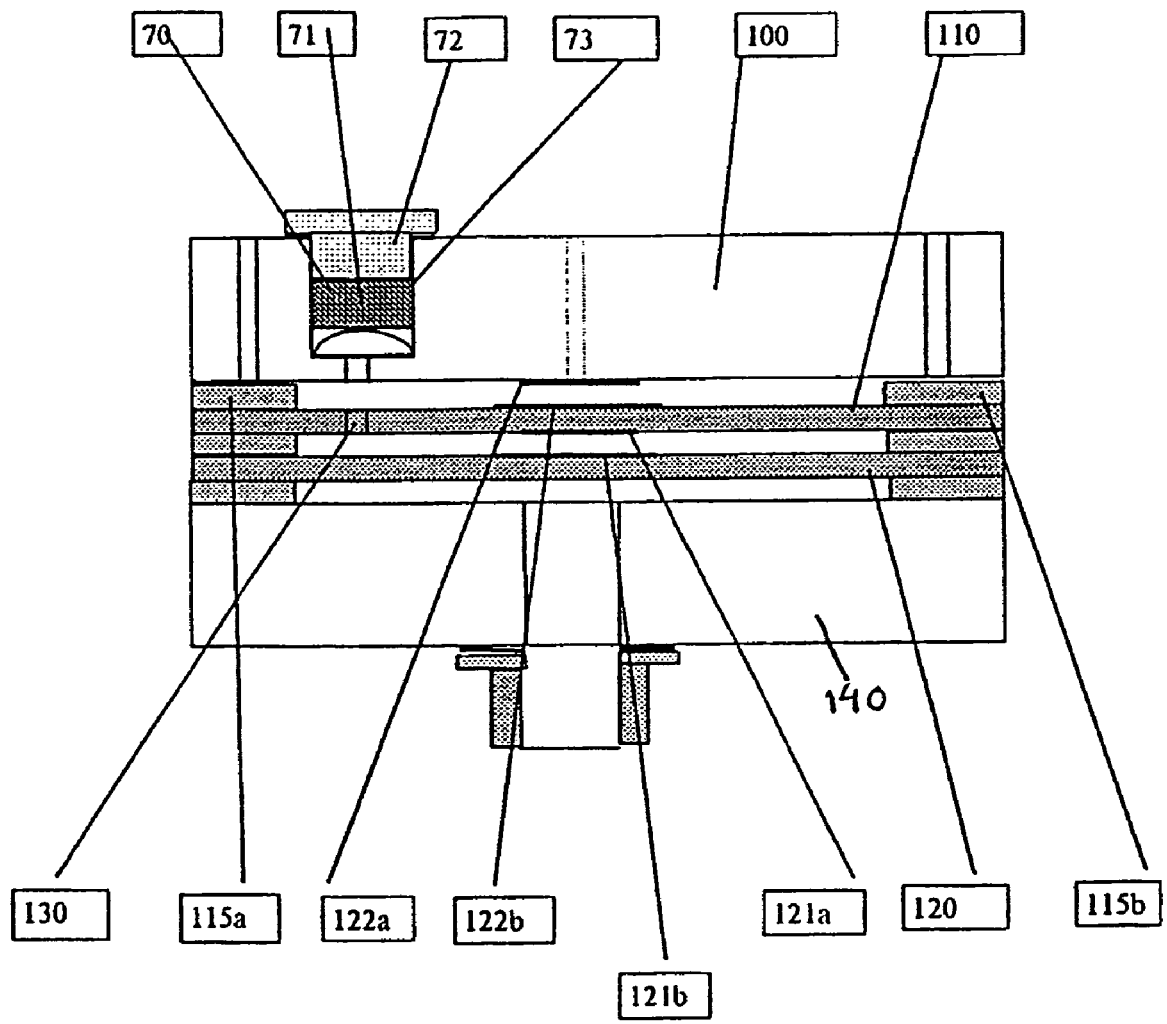

PRESSURE SENSOR FOR DETECTING SMALL PRESSURE DIFFERENCES AND LOW PRESSURES

TECHNICAL FIELD

The present invention relates to a ceramic, capacitive pressure transducer or sensor element for detecting small pressure differences and low pressures.

BACKGROUND

Sensor elements to be used in pressure sensors can be designed to detect strain or capacitance, i.e. be the strain type or the capacitive type. They can be built from various ceramic materials. Ceramic materials based on aluminum oxide are often used in such sensor elements but also glass ceramic materials can be used. A ceramic capacitive sensor element for sensing pressures is usually constructed of two main parts. These parts comprise a stable base plate and a thinner circular plate, also called a diaphragm, a part of which is movable with a pressure difference and which mounted to one of the large surface of the base plate and joined thereto, by for example glass joints at the circular edge of the thin plate and the base plate. The diaphragm has the same diameter as the base plate and has a thickness which is adapted to the magnitude of the load, i.e. the pressure difference to which the diaphragm is intended to be subjected.

The change of the position of the central portion of the diaphragm is detected as a change of a capacitance between two oppositely located electrodes made of e.g., gold, the electrodes being layers which are coated by means of thin film methods on facing surfaces of the base plate and the diaphragm respectively. Such a sensor element can be used for different types of pressure measurements, where the desired variable is a measurement pressure acting on the free surface of the diaphragm, i.e. on the surface which does not face the base plate. The measurement is always made in relation to some form of a reference pressure acting on the inner surface of the diaphragm which faces the base plate and is opposite the free surface. Pressure sensors can be classified based on the way in which the reference pressure is formed. Thus the pressure sensor is:

a "gauge sensor" if the reference pressure=the atmospheric pressure an "absolute sensor" if the reference pressure=a technical zero pressure a "differential sensor" if the reference pressure=a second measurement pressure The diaphragm of such a sensor element is the part which mainly determines the performance of the sensor element. The diaphragm should be as thin as possible in order to provide a high sensitivity. However, a too thin diaphragm can easily break if exposed to too high pressures. Apparently a sensor element intended for measuring extremely small pressures should comprise such a very thin diaphragm but such a diaphragm cannot without taking some precautions be subjected to the atmospheric pressure. However, thin plates, which have been produced by mechanical working such as polishing, always have mechanical stresses and are not completely flat in an unloaded state, at least not for varying ambient temperatures and are thus not suitable to be used in high reliability pressure sensors which are intended for small pressures.

SUMMARY OF THE INVENTION

It is an object of the invention to provide sensor elements which have an extremely high sensitivity and stability and which can stand large pressure variations.

A sensor element of the capacitive type constructed of mainly ceramic materials comprises a circular ceramic plate, also called a diaphragm, which is movable with the pressure of the gas acting on it and which is extremely thin and has typically a thickness less than 0.1 mm for a diameter of 38 mm of the plate, i.e., it has a ratio of the thickness to the diameter which is less than substantially 0.26%. The ratio of the thickness to the diameter of the movable portion of the diaphragm will then be less than about 0.35%. As to its other characteristics the sensor element can be made according to the disclosure of the published International patent application WO98/37392. The extremely thin ceramic diaphragm is furthermore attached between two ceramic elements in a particular manner. Such a mounting allows that the sensor element can be made to have an insignificant temperature drift.

The ceramic material used in the sensor element and in particular in the thin diaphragm is preferably aluminum oxide. Other ceramic materials such as glass ceramic materials can also be used but do not have equally good properties.

In a method of manufacturing such flat, extremely thin diaphragms and of mounting them in sensor elements diaphragms can be obtained which have a low helium permeability which have no viscoelastic properties and which have no mechanic indications of fracture such as micro cracks or similar material defects which can influence the strength of such diaphragms when they are subjected to pressure variations.

Between a base plate and a shielding plate preferably an electrically conductive layer of gold, applied by means of thin film methods, is located according to the disclosure of the published International patent application WO95/28624 in order to change and minimize stray capacitances around the measurement electrodes. Furthermore, on the under surface of the base plate and on the top surface of the shielding plate electrically conductive gold layers can be provided, which have a circular shape and are located opposite or facing each other and thereby form a pair in a reference capacitor.

The shielding layer can be enclosed by a dotted or channelled glass pattern according to the disclosures of published International patent application WO95/28623 and the published International patent application WO98/37393. Furthermore, the reference capacitor can be surrounded by a similar dotted or channelled glass pattern.

A metallic mounting element can be attached to the sensor element according to the disclosure of published International patent application WO95/28623 cited above.

The shielding plate can be a circular ceramic plate which has the same thickness as the thin circular ceramic plate which is movable with the pressure acting on its free surface. Such a thin ceramic shielding plate can further have a small recess, which has by means of laser been cut out of the peripheral edge of the shielding plate. The recess results in that the spaces between the measurement diaphragm and the shielding plate and between the shielding plate and the base plate can be given the same reference pressure.

In sensor elements intended for measurement of absolute pressures an ultra high vacuum reference pressure is provided which is integrated in the reference cavity of the sensor element according to the disclosure of the published International patent application WO98/37392 cited above. A NEG-element (Non Evaporable Getter element) which is active at ambient temperatures maintains the reference pressure at an ultra high vacuum level for long periods of time comprising several years.

A sensor element according to the discussion above is built of three or four circular ceramic plates which in sequence or stacking order comprise:

Case A: a base plate, a diaphragm, a front plate or front ring
Case B: a base plate, a shielding plate, a diaphragm, a front plate or front ring Sensor elements according to Case A are the absolute type intended for measuring absolute pressures. Sensor elements according to Case B comprise both elements intended for measuring absolute pressure and so called gauge-elements according to the definition above, in which the pressure of the atmosphere constitutes a reference in relation to a pressure of a measurement medium which is to measured.

Such capacitive sensor elements comprising extremely thin diaphragms are advantageously used when measuring small pressure differences for flow determination and controlling for example air in ventilation systems and in absolute measurements of low vacuum pressures in for example the manufacture of semiconductors.

A sensor element fabricated according to the principles as indicated above will have insignificant and negligible errors as to non-linearity, repeatability and hysteresis and an insignificant temperature drift of the zero point and in the measurement range of the sensor element.

BRIEF DESCRIPTION OF THE DRAWINGS

The invention will now be described as a non-limiting embodiment with reference to the accompanying drawings, in which:

FIG. 1 is a sectional view of a sensor element having a NEG-element and an extremely thin diaphragm, FIG. 2a is a sectional view of an aluminum oxide film coated on top of a thin polymer film, FIG. 2b is a sectional view of a sintered circular thin aluminum oxide plate, FIG. 2c is a sectional view of a sintered circular thin aluminum oxide film located between two aluminum oxide blocks during a second sintering cycle, FIG. 2d is a sectional view of a turned-around, twice sintered thin aluminum film located between two aluminum oxide blocks during a third sintering cycle, FIG. 3 is a sectional view of jig comprising two aluminum oxide blocks, between which a green film is placed and which are coated with a suitable material in order to avoid adhesion during the sintering cycle, the jig being constructed so that the pressing force between the blocks can be varied when running a sintering process, FIG. 5 is a sectional view of a sensor element comprising an integrated reference electrode and an extremely thin, circular ceramic plate which is movable with a pressure, in which sensor element an integrated technical zero pressure is used as a reference pressure.

DETAILED DESCRIPTION

Figure 4:
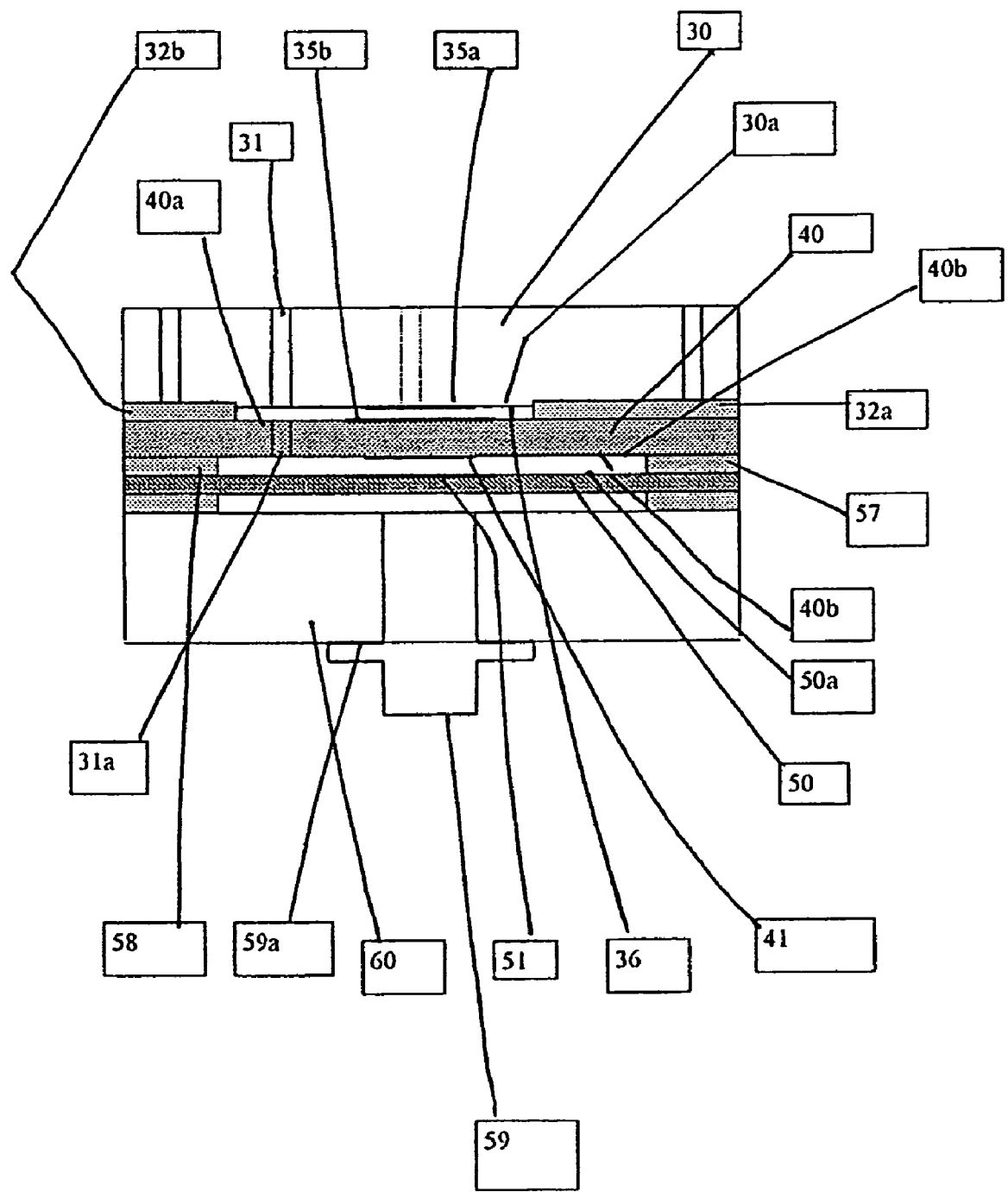
FIG. 4 is a sectional view of a sensor element comprising an integrated reference electrode and an extremely thin circular ceramic plate which is movable with a pressure, in which sensor element the atmospheric pressure is used as a reference.

Sensor elements of the absolute type, i.e., for measuring absolute pressures, according to Case A as defined above consist of three ceramic circular plates. In FIG. 1 such a sensor element 5 is shown which is built of a base plate 10, a front plate 12 and a circular ceramic plate 17, also called a diaphragm, which is movable with the difference of the gas pressures acting on its large surfaces. The diaphragm is extremely thin in relation to its diameter and is located between the base plate and the front plate. In the base plate 10 two circular through-holes 11a and 11b are provided for letting electrical conductors through. On the under side 10a of the base plate 10 an electrically conducting thin film 18b of preferably gold is provided, which is made by means of thin film methods, the free, under surface of this thin film 18b constituting one of two opposite electrically conductive areas which form the measurement capacitor of the sensor element. On the top surface 17a of the diaphragm 17 a second electrode area is constituted by a layer applied to this surface, which thus is opposite or facing the under surface of the thin film 18b. The thin electrically conductive layer 18a on the top side of the diaphragm is preferably made of gold and is made by means of thin film methods. The layer 18a, which forms the electrode area on the diaphragm 17, has a somewhat larger diameter than the thin film layer 18b constituting the upper electrode area on the under side of the base plate 10.

A glass joint 19a between the under side 10a of the base plate 10 and the top side 17a of the diaphragm 17 and a glass joint 19b located between the under side of the diaphragm and the top side of the front plate 12, which is located undermost of the plates, hold the plates to form one single unit.

In the center of the front plate 12 a connection nipple 14 of metal is attached. The connection nipple 14 is attached to the front plate made of a ceramic material according to the disclosure of the cited published International patent application WO95/28623. The connection nipple 14 is made of a special metal alloy. A preferred material is "Vacon 70".

The top side 10b of the base plate 10 has a recess in which an NEG-element 16 is arranged, which rests on a conical spring washer 16a made of an inert material. The NEG-material is enclosed in the reference cavity by a getter lid 15. This construction is disclosed in the cited published International patent application WO98/37392. The base plate 10 and the front plate 12 has advantageously substantially the same thickness.

In the sensor element 5 the ceramic plate 17 which is movable with the pressure is a unique part which has previously been beyond the technical possibility of being produced in order to be used in applications such as measuring small difference pressures in ventilation systems or small absolute pressures in vacuum systems. The ceramic plate 17 is produced of pure crystalline aluminum oxide having very small additives of materials such as, e.g., MgO. It has a great importance that the plate 17 does not have viscoelastic properties caused by a possible amorphous phase in the material.

The plate 17 is manufactured of an aluminum oxide powder having a selected grain size of, for example, an average diameter of 2 µm. It is very important in order for the plate to operate in vacuum applications, the material of the plate has a suitable grain size and thereby a low helium permeability.

Furthermore, it has a great importance, that the plate is plane-parallel, i.e., has completely flat, parallel large surfaces, and has no distortions or other geometric errors. Absolutely correct geometric dimensions are further necessary if the plate is to have no temperature drift, when it in operation is located between a base plate 10 and a front plate 12, which both have substantially the same thickness. The plate 17 has a thickness which does not allow mechanical working of type polishing in order to achieve the intended very small thickness. Furthermore, polishing causes distortions and induces stresses in the plate which when using the sensor element result in fractures.

In order to produce a plane-parallel plate, aluminum oxide powder having a suitable grain size is mixed with a binding agent and a dispersion agent of water soluble types and some water to form a slurry. The aluminum oxide slurry, see FIG. 2a, is coated on top of a thin polymer and by means of a "tape-casting" method to form a film. The obtained film of aluminum oxide is dried to form a green film which can stand to be handled and which is released from the polymer film. From the green film plates 17 having a suitable diameter cut, such as by means of laser light or by shearing operations, e.g. ordinary cutting or punching. The diameter of the plates 17 is selected considering shrinking during the following sintering steps, so that for obtaining a finished diaphragm having a diameter of 38 mm the plates 17 must have a larger diameter of, e.g., 41-44 mm. Thus generally, these plates have been obtained from an aluminum oxide slurry arranged on top of a thin substrate such as a polymer film.

In a heating procedure the green film is sintered in an oven at 1600° C. This sintering is made applying no pressure to the green film. Then the sintered plate obtained after the heating procedure will be deformed, i.e., have changes of its shape, see FIG. 2b. To achieve a completely plane-parallel plate the plate 20 is then sintered a second time between two blocks of polished aluminum oxide having dimensions of for example 50·50·5 mm for a diameter of 38 mm of the finished plate, as exemplified above, see FIG. 2c. The blocks press the deformed plate 20 to a flat condition owing to the weight of the upper block. The plate 20 is then turned around, so that its previously lower surface now is the top surface, and is sintered in this condition between the aluminum oxide blocks a third time, see FIG. 2d. After the third sintering process the ceramic plate 20 is completely plane-parallel and no mechanical working of type polishing has been used in any step of the procedure. Plates having a thickness smaller than 0.1 mm can be obtained using this method.

In FIG. 3 a jig is schematically illustrated, in which the pressing force F from the two blocks 21 and 22 is variable. Then a very small force is applied at the start of the heating procedure, which force is then increased to a value corresponding, for example to the weight of a block 21, 22 as described above. The green film 23 is during the pressing and heating operation placed between bodies such as the blocks 21, 22, which at their pressing surfaces have a thin film coating 24 and 25 of a special material, which is selected, so that the material of the plate, which is to be sintered, cannot adhere to the pressing surfaces during the sintering process. When using a jig as described above the sintering process can be made in one single heating step.

In FIG. 4 a cross-sectional view of a sensor element according to Case B as defined above is shown, which element is intended to be used for measurements using the atmospheric pressure as a reference, in which similar or identical components have been produced substantially as described above. The sensor element is constructed of a base plate 30, a shielding plate 40, a thin diaphragm 50 and a front plate 60. On the under side 30a of the base plate 30, an electrically conducting, thin film area 35a of preferably gold is disposed, which as above is produced by means of thin film methods. Opposite this area, located on the top side 40a of the shielding plate 40, is an electrically conducting thin film area 35b of preferably gold is arranged which is also made by means of thin film methods. The electrically conducting, facing areas form a reference capacitor.

The atmospheric pressure reaches the cavity around the reference capacitor through a channel 31. The cavity is enclosed by a glass joint 32a and 32b, which has been applied as a dotted or channelled pattern according to the disclosure of the cited published International patent application WO95/28623. The cavity around the reference electrode pair 35a and 35b consists of an interspace or gap 36 having a thickness of 20-50 μm. The thickness of the interspace 36 is determined by glass joints 32a and 32b. A preferred gap thickness is 20 μm. If the space between the base plate 30 and the shielding plate 40 is used also for integrating thermistor elements according to what is described in the cited Swedish patent application 9700613-4, the interspace 36 can instead have a thickness of 50 μm.

Further, on the under side 40b of the shielding plate 40 an electrically conducting thin film area 41 of preferably gold is applied. On the top side 50a of the thin plate 50 an electrically conducting thin film area 51 of preferably gold is also applied. These opposite or facing areas 41 and 51 form an electrode pair which constitutes the measurement capacitor of the sensor element. The atmospheric pressure reaches the cavity between the under surface 40b of the shielding plate 40 and the top side 50a of the thin plate 50 through a prolongation of the channel 31 in the base plate 30, which is formed by a channel 31a in the shielding plate 40.

In this preferred embodiment of a gauge-element, in which the atmospheric pressure is the reference pressure, the reference electrode pair 35a, 35b and the measurement electrode pair 41, 51 will be exposed to the humidity of air. Using suitably designed electronic circuits for determining suitable electric quantities of the reference electrode pair and the measurement electrode pair it can be obtained, that the influence of the air humidity on the capacitance between measurement electrode and reference electrode cancel each other. When using the element, the measured values will have no dependency on the humidity of air.

In a preferred embodiment the capacitance of the reference capacitor will not change when the plate 50 which is movable with the pressure changes the electric characteristic to value given by the measurement capacitor. A reference capacitor having a capacitance changing with the pressure results in linearity errors so that the measured values do not agree with the theoretical relations described in the cited published International patent application WO95/28624.

A preferred distance between the measurement electrode areas 41 and 51 are as above 20 μm. The distance is defined by glass joints 57 and 58. In the front plate 60, which has a thickness corresponding substantially to the sum of the thicknesses of the base plate 30 and the shielding plate 40, a connection nipple 59 of a metallic material is attached. In a preferred embodiment the nipple is made of "Vacon 70" as described above. The joint 59a between the connection nipple 59 and the front plate 60 of aluminum oxide gives a hermetic and stable mounting of the nipple.

In FIG. 5, a sensor of the same type as in FIG. 4 is illustrated in which the channel 31 is replaced by an NEG-element 70, a spring washer 71, a getter lid 72 and a recess 73 in the base plate 100, compare also the sensor element of FIG. 1. The element thus belongs to Case B as defined above comprising an absolute reference pressure. The shielding plate can be designed to have a thickness of 0.5 mm. In a preferred embodiment, the shielding plate is substantially thinner than in the embodiment according to FIG. 4 and can have substantially the same thickness as the plate 120 which is movable with the pressure.

The glass joints 115a and 115b between the base plate 100 and the shielding plate 110 are in a preferred embodiment part of a circular ring and the channel 130 is a hole cut by means of laser light in the shielding plate 110. When using a ceramic plate 120 which is movable with the pressure and has a thickness of the magnitude of order of 50 μm or less the influence of gravitation on such a plate will cause that the angular position of the sensor element, i.e. whether it is placed in a vertical or horizontal direction, will affect the capacitive value of the measurement capacitor formed by the electrodes 121*a*, 121*b*.

The own weight of the thin plate 120 results, for a rotation of the sensor element from a horizontal position to a vertical position and for an inverse movement, in a change of the capacitive value of the measurement electrodes.

The reference electrode pair 122*a*, 122*b* will, in the case where the shielding plate 110 has substantially the same thickness as the thin plate 120, cause a corresponding change of the capacitive value of the reference electrode which change has an equal magnitude. For suitably designed electronic circuits for detecting the capacitances of the measurement electrode pair and the reference electrode pair, this influence of the gravitation can be compensated and thereby also the geometric orientation of the sensor element.

What is claimed:

1. A pressure sensor comprising:
   an extremely thin diaphragm plate produced by sintering a ceramic material that is subjected to a pressing force during a portion of the sintering, the diaphragm plate having a movable portion, mounted for movement in response to a pressure to be measured;
   said diaphragm plate including an electrode, the position of which can be electronically sensed; and
   wherein said diaphragm plate has a thickness smaller than 0.35% of the diameter of said movable portion thereof.

2. A pressure sensor according to claim 1 wherein said plate is made of a ceramic material.

3. A pressure sensor according to claim 1 wherein said ceramic material is aluminum oxide.

4. A pressure sensor comprising:
   a substantially rigid base plate;
   a diaphragm plate, having at least a portion thereof which is movable in response to a pressure;
   a first cavity formed between the base plate and the diaphragm plate, for forming a measurement electrode pair;
   a shielding plate having a front surface, which forms a wall of the first cavity and is part of the measurement electrode pair, and a rear surface; and
   a second cavity formed between the rear surface of the shielding plate and a surface of the base plate, the walls of the second cavity forming a reference electrode pair, for compensating measurement values captured by the measurement electrode.

5. A pressure sensor according to claim 4, wherein said shielding plate has substantially the same thickness as said diaphragm plate.

6. A pressure sensor according to claim 4, wherein said second cavity is connected to a reference pressure.

7. A pressure sensor according to claim 6 wherein the reference pressure is obtained by connecting the second cavity to a space containing a getter.

8. A pressure sensor according to claim 4, wherein said movable portion of said diaphragm plate has a thickness smaller than 0.35% of the diameter of said movable portion.

9. A pressure sensor according to claim 5, wherein said movable portion of said diaphragm plate has a thickness smaller than 0.35% of the diameter of said movable portion.

10. A pressure sensor comprising:
    a pressure housing assembly made of substantially ceramic materials comprising a substantially rigid base plate, a front plate, and an extremely thin diaphragm plate produced by sintering a film of ceramic material that is subjected to a variable pressing force during a portion of the sintering, the diaphragm plate being at least partly movable in response to a pressure;
    said diaphragm plate being directly disposed between the base plate and the front plate to form a cavity between a side of the diaphragm plate and a side of the base plate, so that the walls of the cavity form a measurement electrode; and
    wherein the base plate and the front plate have substantially the same thickness and are made of substantially the same material.

11. A pressure sensor according to claim 10, wherein the front plate and the base plate have through-holes, the cross-sectional areas of which are small portions of the total area of the respective plate.

12. A pressure sensor, comprising:
    a body made of a first substantially ceramic material defining an interior volume, the body including a wall defining a first aperture; and
    a flexible diaphragm produced by sintering a second substantially ceramic material that is subjected to pressing force during a portion of the sintering, the diaphragm having a thickness smaller than 0.35% of the diameter of the diaphragm and the diaphragm dividing the interior volume into a first portion and a second portion, the first aperture being in fluid communication with the first portion, at least a first part of the diaphragm moving in a first direction when a pressure in the first portion increases relative to a pressure in the second portion, the first part of the diaphragm moving in a second direction when the pressure in the first portion decreases relative to the pressure in the second portion, the first part of the diaphragm and at least a first part of the body being characterized by a measurement capacitance, and the measurement capacitance changing in response to movement of the first part of the diaphragm relative to the first part of the body.

13. The pressure sensor of claim 12, the pressing force varying during the portion of the sintering.

14. The pressure sensor of claim 12, the first substantially ceramic material being aluminum oxide.

15. The pressure sensor of claim 12, the second substantially ceramic material being aluminum oxide.

16. The pressure sensor of claim 12, the second substantially ceramic material being aluminum oxide and a small amount of magnesium oxide.

17. The pressure sensor of claim 12, the body further including a shield plate disposed in the second portion of the interior volume, the shield plate having a first surface and a second surface opposite the first surface, the first part of the diaphragm and at least a portion of the first surface of the shield plate characterized by the measurement capacitance, and at least a portion of the shield plate and a second part of the body characterized by a reference capacitance.

18. The pressure sensor of claim 17, the shield plate having substantially the same thickness as the diaphragm.

19. The pressure sensor of claim 17, the shield plate being produced by sintering a substantially ceramic material that is subjected to pressing force during a portion of the sintering.

20. The pressure sensor of claim 19, the pressing force varying during the portion of the sintering.

* * * * *